US006965464B2

United States Patent
Mossberg

(10) Patent No.: US 6,965,464 B2
(45) Date of Patent: *Nov. 15, 2005

(54) OPTICAL PROCESSOR

(75) Inventor: Thomas W. Mossberg, Eugene, OR (US)

(73) Assignee: LightSmyth Technologies Inc, Eugene, OR (US)

( * ) Notice: Subject to any disclaimer, the term of this patent is extended or adjusted under 35 U.S.C. 154(b) by 278 days.

This patent is subject to a terminal disclaimer.

(21) Appl. No.: 09/843,597

(22) Filed: Apr. 26, 2001

(65) Prior Publication Data

US 2003/0117677 A1 Jun. 26, 2003

Related U.S. Application Data

(63) Continuation-in-part of application No. 09/811,081, filed on Mar. 16, 2001.
(60) Provisional application No. 60/190,126, filed on Mar. 16, 2000, provisional application No. 60/199,790, filed on Apr. 26, 2000, provisional application No. 60/235,330, filed on Sep. 26, 2000, and provisional application No. 60/247,231, filed on Nov. 10, 2000.

(51) Int. Cl.[7] .................................................. G03H 1/00
(52) U.S. Cl. ........................ 359/34; 359/15; 359/566; 359/574; 359/575; 385/37
(58) Field of Search .............................. 359/559, 3, 4, 359/7, 15, 19, 16, 29, 34, 566, 573, 574, 575; 349/200–202, 33, 92; 385/37

(56) References Cited

U.S. PATENT DOCUMENTS

| 4,006,967 A | * | 2/1977 | Kenan et al. ............... 359/286 |
| 4,140,362 A | | 2/1979 | Tien |
| 4,387,955 A | | 6/1983 | Ludman et al. |
| 4,440,468 A | | 4/1984 | Auracher et al. |
| 4,660,934 A | | 4/1987 | Akiba et al. |
| 4,740,951 A | | 4/1988 | Lizet et al. |

(Continued)

FOREIGN PATENT DOCUMENTS

| EP | 0 310 438 A1 | 4/1989 |
| GB | 2 168 215 A | 6/1986 |
| WO | WO 99/35523 A1 | 7/1999 |
| WO | WO 99/56159 A1 | 11/1999 |

OTHER PUBLICATIONS

Brady, D.J. et al., "Holographic Interconnections in Photorefractive Waveguides," Applied Optics, Jun. 10, 1991, vol. 30, No. 17, 10 pgs.
Preston, K., Jr., "Digital Holographic Logic," Pattern Recognition, vol. 5, 1973, pp. 37–49.
Shogo Ura, et al., "Integrated Optic Wavelength Demultiplexer Using a Coplanar Grating Lens", Applied Optics, Mar. 20, 1990, pp. 1369–1373, vol. 29, No. 9, Optical Society of America, New York, USA.
Ray T. Chen, et al., "Ten Channel Single–Mode Wavelength Division Demultiplexer in Near IR", Integrated Optical Circuits, Sep. 3, 1991, pp. 134–142, Vole 1583, The International Societ for Optical Engineering, Boston, Massachusetts, USA.

(Continued)

Primary Examiner—Leonidas Boutsikaris
(74) Attorney, Agent, or Firm—David S. Alavi

(57) ABSTRACT

Method and apparatus are disclosed for optical packet decoding, waveform generation and wavelength multiplexing/demultiplexing using a programmed holographic structure. A configurable programmed holographic structure is disclosed. A configurable programmed holographic structure may be dynamically re-configured through the application of control mechanisms which alter operative holographic structures.

69 Claims, 13 Drawing Sheets

U.S. PATENT DOCUMENTS

| | | |
|---|---|---|
| 4,743,083 A | 5/1988 | Schimpe |
| 4,746,186 A | 5/1988 | Nicia |
| 4,773,063 A | 9/1988 | Hunsperger et al. |
| 4,786,133 A | 11/1988 | Gidon et al. |
| 4,824,193 A | 4/1989 | Maeda et al. |
| 4,834,474 A | 5/1989 | George et al. |
| 4,923,271 A | 5/1990 | Henry et al. |
| 4,938,553 A | 7/1990 | Maerz et al. |
| 5,107,359 A | 4/1992 | Ohuchida |
| 5,195,161 A | 3/1993 | Adar et al. |
| 5,357,591 A | 10/1994 | Jiang et al. |
| 5,450,511 A | 9/1995 | Dragone |
| 5,768,450 A | 6/1998 | Bhagavatula |
| 5,812,318 A * | 9/1998 | Babbitt et al. ............... 359/559 |
| 5,830,622 A | 11/1998 | Canning et al. |
| 6,011,884 A | 1/2000 | Dueck et al. |
| 6,011,885 A | 1/2000 | Dempewolf et al. |
| 6,137,933 A | 10/2000 | Hunter et al. |
| 6,169,613 B1 | 1/2001 | Amitai et al. |
| 6,285,813 B1 * | 9/2001 | Schultz et al. ................ 385/37 |
| 6,323,970 B1 * | 11/2001 | Popovich ....................... 359/4 |
| 6,702,897 B2 * | 3/2004 | Cullen et al. ............... 118/719 |

OTHER PUBLICATIONS

W. R. Babbit, et al., "Spatial Routing of Optical Beams Through Time–Domain Spatial–Spectral Filtering", Optics Letters, Apr. 15, 1995, pp. 910–910, vol. 20, No. 8, Optical Society of America, USA.

T. W. Mossberg, "Planar Holographic Optic Processing Devices", Optics Letters, Apr. 1, 2001, pp. 414–416, vol. 26, No. 7, Optical Society of America, USA.

B.A. Capron, et al., Design and Performance of a Multiple Element Slab Waveguide Spectrograph for Multimode Fiber–Optic WDM Systems, Journal of LightWave Technology, vol. 11 No. 12., Dec. 1993., IEEE Log No. 9211169, pp. 2009–2014.

R.J. Deri, et al., Quantitative Analysis of Integrated Optic Waveguide Spectrometers., IEEE Photonics Technology Letters, vol. 6, No. 2, Feb. 1994., pp. 242–244.

A. Grunnet–Jepsen, et al., Fibre Bragg grating based spectral encoder/decoder for lightwave CDMA. Electronics Letters vol. 35., No. 13, Jun. 24th, 1999., pp. 1096–1097.

P.Paddon and Jeff F. Young, Simple approach to coupling in textured planar waveguides, Optical Society of America 1998, vol. 23, No. 19. pp. 1529–1531.

C.K. Madsen, et al., Planar Waveguide Optical Spectrum Analyzer Using a UV–Induced Grating, IEEE Journal of selected topics in quantum electronics, vol. 4, No. 6, Nov. 1998, pp. 925–929.

Emilio Gini, et al., Polarization Independent InP WDM Multiplexer/Demultiplexer Module., Journal of Lightwave Technology, vol. 16, No. 4., Apr. 1998, pp. 625–630.

Robert W. Day, et al., Filter–Response Line Shapes of Resonant Waveguide Gratings., Journal of Lightwave Technology. vol. 14, No. 8, Aug. 1996., pp. 1815–1824.

K.A. McGreer., Tunable Planar Concave Grating Demultiplexer., IEEE Photonics Technology Letters, vol. 8. No. 4, Apr. 1996., pp. 551–553.

Suning Tang, et al., A Novel Wavelength–Division–Demultiplexer with Optical In–Plane to Surface–Normal Conversion., IEEE Photonics Technology Letters, vol. 7, No. 8, Aug. 1995.

K.A. McGreer, Diffraction from Concave Gratings in Planar Waveguides., IEEE Photonics Technology Letters, vol. 7. No. 3, Mar. 1995., pp. 324–326.

Hirokazu Takenouchi, et al., Analysis of optical–signal processing using an arrayed–waveguide grating., Optics Express, vol. 6, No. 6, Mar. 13, 2000., pp. 124–135.

A.Grunnet–Jepsen, et al., Demonstration of All–Fiber Sparse Lightwave CDMA Based on Temporal Phase Enconding., Photonics Technology Letters, vol. 11 No. 10, Oct. 1999.

Randall Babbitt, et al., Optical waveform processing and routing with structured surface gratings., Optics Communications 148, 1998., pp. 23–26.

Gerald A. Brigham, et al., Analysis of scattering from large planar gratings of compliant cylindrical shells., Acoust Society of America, vol. 61, No. 1, Jan. 1997. pp. 48–59.

T.Kurokawa, et al., Time–space–conversion optical signal processing using arrayed–waveguide grating., Electronics Letters vol. 33, No. 22, Oct. 23, 1997. pp. 1890–1891.

Aasmund Sv. Sudbo, et al., Reflectivity of Integrated Optical Filters Based on Elliptic Bragg Reflectors., Journal of Lightwave Technology vol. 8, No. 6, Jun. 1990. pp. 998–1006.

Charles H. Henry., Four–Channel Wavelength Division Multiplexers and Bandpass Filters Based on Elliptical Bragg Reflectors., Journal of Lightwave Technology vol. 8. No. 5, May 1990 IEEE., pp. 748–755.

E.M. Koontz, et al., Preservation of rectangular–patterned InP gratings overgrown by gas source molecular beam epitaxy., Appl. Phys. Lett vol. 71, No. 10, Sep. 1997., pp. 1400–1402.

Seok Ho Song, et al., Focusing–grating–coupler arrays for uniform and efficent signal distribution in a backboard optical interconnect., Optical Society of America 1995., Applied Optics vol. 34, No. 26., Sep. 10, 1995., pp. 5913–5919.

John C. Brazas, et al., Analysis of input–grating couplers having finite lengths., Applied Optics vol. 34, No. 19., Jul. 1, 1995., pp. 3786–3792.

Keith A. Bates, et al., Gaussian beams from variable groove depth grating couplers in planar waveguides., Applied Optics vol. 32, No. 12., Apr. 20, 1993., pp. 2112–2116.

S.S. Wang, et al., Theory and applications of guided–mode resonance filters., Applied Optics vol. 32 No. 14., May 10, 1993., pp. 2606–2613.

R. Magnusson, et al., New Principle for optical filters., American Institute of Physics 1992., Appl. Phys. Lett. vol. 61, No. 9., Aug. 31, 1992., pp. 1022–1024.

S.M. Ojha, et al., Demonstration of low loss integrated InGaAsP/InP demultiplexer device with low polarisation sensitivity., Electronics Letter vol. 29, No. 9., Apr. 29, 1993.

Lifeng Li., Analysis of planar waveguide grafting couplers with double surface corrugations of identical period., 1995 Elsevier Science B.V., Optics Communications 114., pp. 406–412.

J.B.D. Soole, et al., High speed monolithic WDM detector for 1.5 um fibre band., Electronics Letters vol. 31., No. 15., Jul. 20, 1995., pp. 1276–1277.

J.T. Rantala, et al., Sol–gel hybrid glass diffractive elements by direct electron–beam exposure., Electronics Letters vol. 34., N . 5., Mar. 5, 1998., pp. 455–456.

M.A. Cowin, et al., Compact polymeric wavelength division multiplexer., Electronics Letters vol. 35., No. 13., Jun. 24, 1999., pp. 1074–1076.

J. Canning, et al., Grating structures with phase mask period in silica–on–silicon planar waveguides., 1999 Elsevier Science B.V., Optics Communications 171., pp. 213–217.

P.K. Tien, et al., Use f concentric–arc grating as a thin–film spectrograph for guided waves., 1980 American Institute of Physics., pp. 524–525.

Akimasa Kaneko, et al., Design and Application of Silica–Based Planar Lightwave Circuits., IEEE Journal of selected topics in quantum electronics vol. 5., No. 5., Sep./Oct. 1999., pp. 1227–1236.

Z. J. Sun, et al., Demultiplexer with 120 channels and 0.29–nm channel spacing., IEEE Photonics Technology Letters, vol. 10, No. 1., Jan. 1998., pp. 90–92.

C.K. Madsen, et al., Planar waveguide optical spectrum analyzer using a UV–induced grating., IEEE Journal f selected t pics in quantum electr nics., vol. 4, N . 6., Nov./Dec. 1998., pp. 925–929.

Ivan A. Avrutsky, et al., Multiwavelength diffraction and apodization using binary superimposed gratings., IEEE Photonics Technology Letters, vol. 10, No. 6, Jun. 1998., pp. 839–841.

A.T. Alavie, et al., A Multiplexed bragg grating fiber laser sensor system., IEEE Photonics Technology Letters, vol. 5, No. 9, Sep. 1993., pp. 1112–1114.

Xiaoli Fu, et al., 1×8 supergrating wavelength–division demultiplex r in a silica planar waveguide., 1997 Optical S ciety of America., Optics L tters vol. 22, No. 21., pp. 1627–1629.

M.R. Wang, et al., Five–channel polymer waveguide wavelength division demultiplexer for the near infrared., IEEE Photonics Technology Letters, vol. 3. No. 1., Jan. 1991., pp. 36–38.

Michael R. Wang, et al., Wavelength–division multiplexing and demultiplexing on locally sensitized single–mode polymer microstructure waveguides., 1990 Optical Society America, Optics Letters vol. 15, No. 7., Apr. 1, 1990, pp 363–365.

Chunmeng Wu, et al. Simplifi d c upled–wave quations for cylindrical waves in circular grating planar waveguides., Journal f Lightwave Technology, vol. 10, No. 11, Nov. 1992., pp. 1575–1589.

Louay Eldada, et al., Dispersive properties of planar polymer bragg gratings., IEEE Photonics Technology Letters, vol. 12, No. 7, Jul. 7, 2000., pp. 819–821.

Ray T. Chen, et al., Guided–wave planar optical interconnects using highly multiplexed polymer waveguide holograms., Journal of Lightwave Technology, vol. 10, No. 7, Jul. 1992., pp. 888–897.

V. Minier, et al., Diffraction characteristics of superimposed holographic gratings in planar optical waveguides., IEEE Phot nics Technology L tters, vol. 4, No. 10, Oct. 1992.

Tetsuo Miya, Silica–based planar lightwave circuits: passive and thermally active devices., IEEE Journal of selected topics in quantum electronics, vol. 6, No. 1, Jan./Feb. 2000., pp. 38–45.

Johan Backlund, et al., Multifunctional grating couplers for bidirectional incoupling into planar waveguides., IEEE Photonics Technology Letters, vol. 12, No. 3, Mar. 2000., pp. 314–316.

D. Wiesmann, et al., Apodized surface–corrugated gratings with varying duty cycles., IEEE Ph t nics Technology Letters, vol. 12, No. 6, Jun. 6, 2000., pp. 639–641.

* cited by examiner-

OPTICAL PROCESSOR

This U.S. patent application is a Continuation in Part from U.S. non-provisional application Ser. No. 09/811,081, titled "Holographic Spectral Filter," filed Mar. 16, 2001, which claims the benefit of U.S. Provisional Application No. 60/190,126, filed Mar. 16, 2000, and of U.S. Provisional Application No. 60/199,790 filed Apr. 26, 2000, and of U.S. Provisional Application No. 60/235,330 filed Sep. 26, 2000, and of U.S. Provisional Application No. 60/247,231 filed Nov. 10, 2000.

FIELD

The field of interest is optical signal processing.

BACKGROUND

Spectral filtering is a very useful optical function that can be utilized to control the temporal waveform of pulsed optical signals, to cross-correlate or otherwise process optical signals, and to differentially control and manipulate spectrally-distinguished optical communication channels, as found for example in wavelength-division-multiplexed (WDM) optical communication systems. Devices have been introduced over the years to perform spectral filtering, all of which have characteristic shortcomings, along with their strengths. In many cases these shortcomings, including limited spectral resolution, alignment sensitivity, fabrication difficulties, high cost, and lack of flexibility, have prevented widespread application.

A spectral filtering device, according to the present usage, is a device that applies a fixed or dynamically re-programmable, complex-valued, spectral transfer function to an input signal. If $E_{in}(\omega)$ and $E_{out}(\omega)$, respectively, represent Fourier spectra of input and output signals, computed on the basis of the time-varying electric fields of the two signals, and $T(\omega)$ is a complex-valued spectral transfer function of modulus unity or smaller, the effect of the spectral filtering device can be represented as $$E_{out}(\omega) = T(\omega) \cdot E_{in}(\omega)$$

The transfer function $T(\omega)$ has an overall width $\Delta_\omega$ and a resolution width $\Delta_r$, where the latter quantity is the minimum spectral interval over which $T(\omega)$ displays variation (see FIG. 1). $\Delta_r$ is a measure of the transformation ability of a spectral filtering device. The physical characteristics of a spectral filtering device 100 determine the range and types of spectral transfer functions that it can provide. We limit our discussion here to spectral filtering devices that act to apply a fully coherent transfer function, i. e. the device fully controls the amplitude and phase shifts applied to an input signal spectrum, except for an overall phase factor.

As a special case, if $T(\omega)$ is set equal to the conjugate Fourier spectrum $E_{ref}^*(\omega)$ of a reference temporal waveform, also called the design temporal waveform, the output field from the spectral filtering device is proportional to the cross-correlation of the input field with the reference temporal waveform. Temporal cross-correlation capability is widely useful in temporal pattern recognition.

Spectral filtering devices can be utilized to transform input signals from one format into another, or to tailor spectra to some preferred form. A spectral filtering device, according to the present usage, may or may not have the additional capacity to transform the spatial wavefront of input optical signals.

The capabilities of a spectral filtering device can be utilized in multiple ways in communications systems, including signal coding and decoding for Code-Division Multiplexing (CDM), optical packet recognition, code-based contention resolution, as WDM multiplexers and demultiplexers, and as WDM add/drop multiplexers. FIG. 2 (prior art) depicts the encoding and decoding of optical signals in a CDM context. Data 202 is input through a first communication channel, and data 206 is input through a second communication channel. Data 202 passes through a spectral filter 204, which encodes data 202 with an identifying code. Similarly, data 206 is encoded with an identifying code by a spectral filter 208. The encoded signals are combined and transmitted over an optical transmission line 210. At their destination the encoded signals are split into two paths, 212 and 214. The upper path 212 feeds into a spectral filter 216, which imparts a transfer function that is the conjugate transfer function of the filter 204. The output of spectral filter 216 is a signal comprising the superposition of data 202 and data 206; however, due to the encoding imparted by spectral filters 204 and 208 and subsequent decoding by spectral filter 216, this output signal contains a component 218 originating from 202 that has a specific recognizable temporal waveform, typically comprising a brief high power peak for each bit transmitted, along with a component 220 originating from data 206. In the upper path, the component originating from data 206 has a temporal waveform structure that can be discriminated against in detection. Typically, the component 220 originating from the data 206, has no brief high power peak.

In similar fashion, the lower branch 214 feeds into a spectral filter 222, the output of which is a signal made up of the superposition of a component 224 originating from data 206, and a component 226 originating from signal 202. As before, the two signal components have distinguishable temporal waveforms, with the component from data 206 typically having a brief detectable high power peak while the component from data 202 lacking the brief high power peak, and hence remaining below a detection threshold. An element in CDM detection is the implementation of thresholding in the detection scheme that can distinguish input pulses of differing temporal waveform character.

A variety of other CDM methods are known, many of them having need for high performance spectral filtering devices. Some alternative CDM approaches operate entirely with spectral coding. Different applications for high performance spectral filtering devices exist. Spectral filtering devices capable of accepting multiple wavelength-distinguished communication channels through a particular input port, and parsing the channels in a predetermined fashion to a set of output ports, i.e., a WDM demultiplexer, have wide application. This is especially true if the spectral filtering device is capable of handling arbitrary spectral channel spacing with flexible and controllable spectral bandpass functions.

There is another class of spectral filters wherein the entire spectral filtering function is effected through diffraction from a single diffractive structure, having diffractive elements whose diffractive amplitudes, optical spacings, or spatial phases vary along some design spatial dimension of the grating. Diffractive elements correspond, for example, to individual grooves of a diffraction grating, or individual periods of refractive index variation in a volume index grating. Diffractive amplitude refers to the amplitude of the diffracted signal produced by a particular diffraction element, and may be controlled by groove depth or width, magnitude of refractive index variation, magnitude of absorption, or other quantity, depending on the specific type of diffractive elements comprising the diffractive structure under consideration. Optical separation of diffractive elements refers to the optical path difference between diffractive elements. Spatial phase refers to the positioning as a function of optical path length of diffractive elements relative to a periodic reference waveform. The spatial variation of the diffractive elements encodes virtually all aspects of the transfer function to be applied. We refer here to diffractive structures whose diffractive elements (grooves, lines, planes, refractive-index contours, etc.) possess spatial variation representative of a specific spectral transfer function by use of the term "programmed." Programmed diffractive structures, i.e. those structures whose diffractive elements possess spatial structure that encode a desired spectral transfer function, have only been previously disclosed in the case of surface relief grating filters, and in fiber grating filters whose diffractive elements correspond to lines (or grooves) and constant index planes, respectively. Programmed diffractive structures known in the art do not provide for the implementation of general wavefront transformations simultaneously with general spectral transformations.

Programmed surface gratings and programmed fiber gratings are encumbered with severe functional constraints. A programmed surface-grating filter has a fundamentally low efficiency when used to implement complex spectral transformations, and requires alignment sensitive free-space optical elements to function. Programmed single-mode fiber-grating filters, i.e., fiber-grating filters comprising single-mode optical fiber, produce output signals that are difficult to separate from input signals (since they can only co- or counterpropagate). Furthermore, when light is input to the device and output from the device using only the single propagating mode of the fiber, programmed single-mode fiber-grating filters can only support a single transfer function within a given spectral window.

SUMMARY OF THE INVENTION

Method and apparatus are disclosed for optical packet decoding, waveform generation and wavelength multiplexing/demultiplexing using a programmed holographic structure. A configurable programmed holographic structure is disclosed. A configurable programmed holographic structure may be dynamically re-configured through the application of control mechanisms which alter operative holographic structures.

DETAILED DESCRIPTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Various operations will be described as multiple discrete steps in turn, in a manner that is most helpful in understanding the present invention. However, the order of description should not be construed as to imply that these operations are necessarily order dependent. In particular, these operations need not be performed in the order of presentation.

A temporal-imaging device, also referred to as a programmed holographic structure herein, typically comprises a thin slab of substrate material having centimeter-scale extent in the x- and y-directions, and micron-scale extent in the z-direction, ideally confining waves to a single mode (or a few modes, to allow polarization design flexibility) along the z-direction. Input and output signals typically propagate within the slab substantially in the x-y plane. Optical signals are typically coupled into the programmed holographic structure along its edge or via waveguide structures, or as otherwise convenient. The temporal-image structure written within the thin (alternatively called planar herein) slab diffracts the input signal or signals to one or more output ports, while simultaneously applying a programmed temporal transfer function.

The manufacture of a programmed holographic structure may be accomplished by a number of methods. Due in part to the thinness of the planar slab, the requisite structure can be imparted by, e.g., deformation of the slab's x-y surface through a stamping or etching process, or by deposition of an index-perturbing structured surface layer. Holographic optical exposure may also be utilized. Fabrication of thin structures typically mandates a robust support structure attached to one or both sides of the device in the x-y plane.

Coupling of input and output waveguides, typically optical fibers, to a planar, thin-slab device eliminates a fundamental disadvantage of one-dimensional devices , i.e., superimposed input and output directions. Coupling of input and output waveguides, typically optical fibers, to a planar, thin-slab device also offers the potential of multi-channel coding and decoding in a single device. Another advantage of the programmed holographic structure approach is the ability, through use of semiconductor materials, to integrate diffraction-based optical and electronic processing onto a single substrate.

Figure 1:
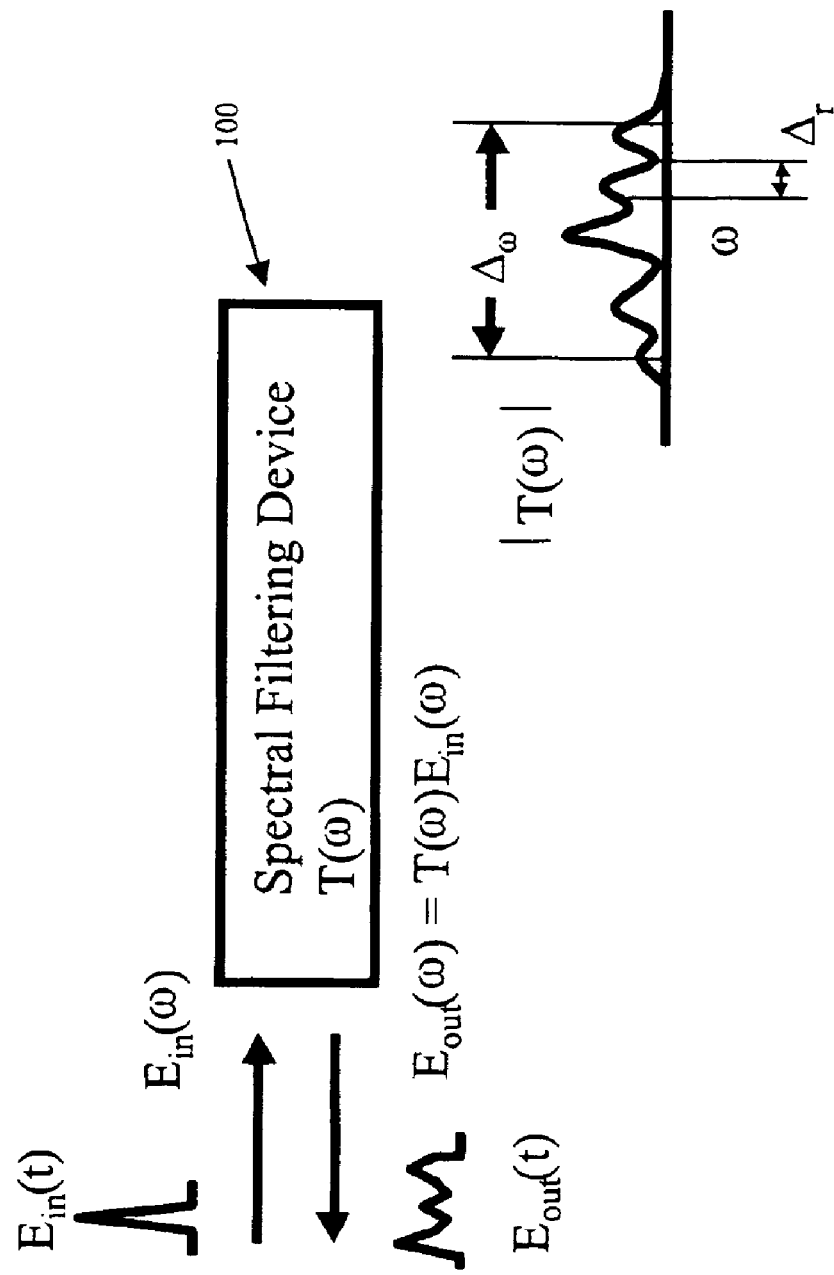
FIG. 1 (prior art) shows a block diagram of an input signal $E_{in}(t)$ accepted by a spectral filtering device comprising a transfer function $T(\omega)$, and a processed output signal $E_{out}(t)$.
Figure 2:
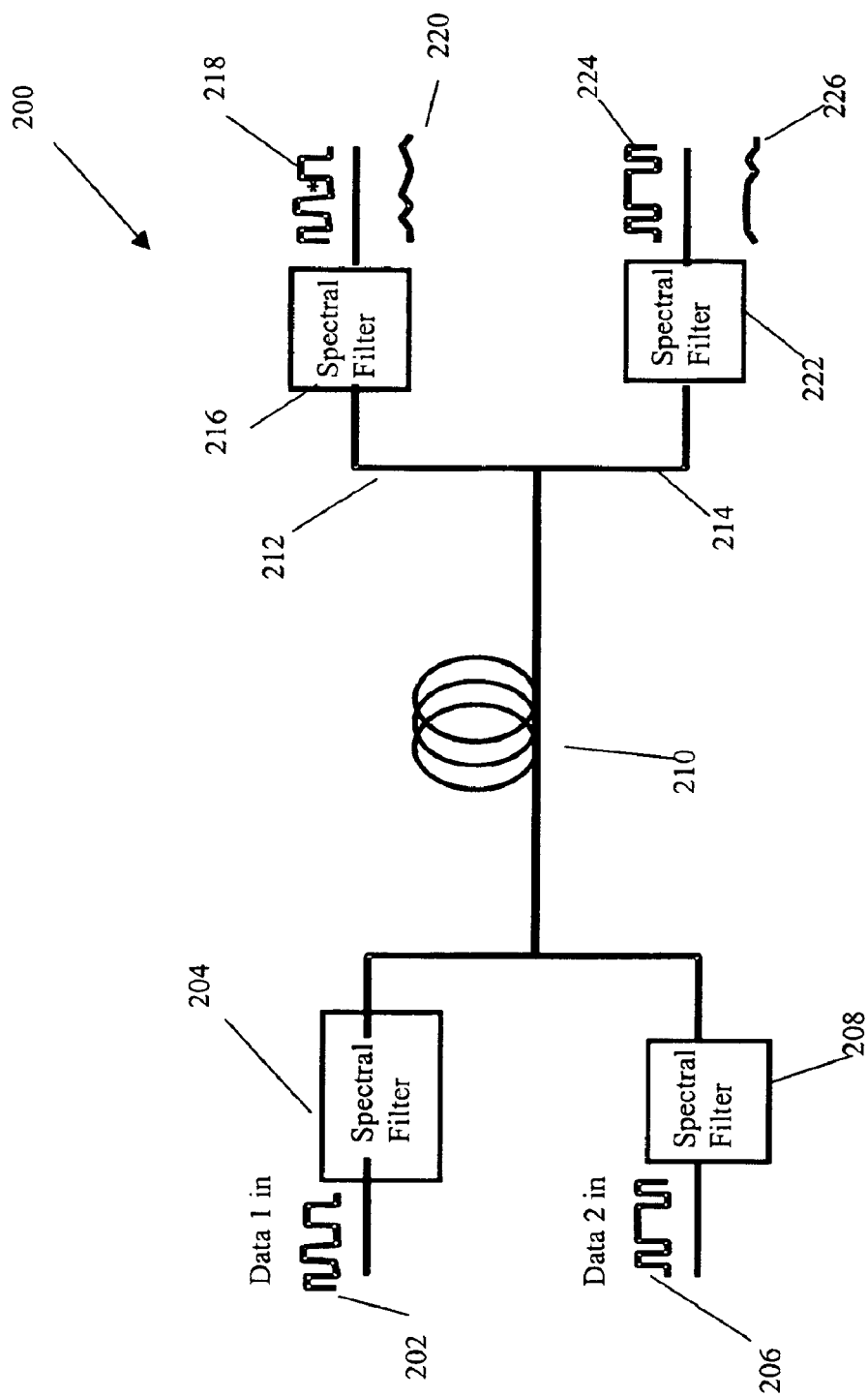
FIG. 2 (prior art) shows a block diagram of data input from two sources, applying a spectral filter to each input, transmission and subsequent decoding.
Figure 3:
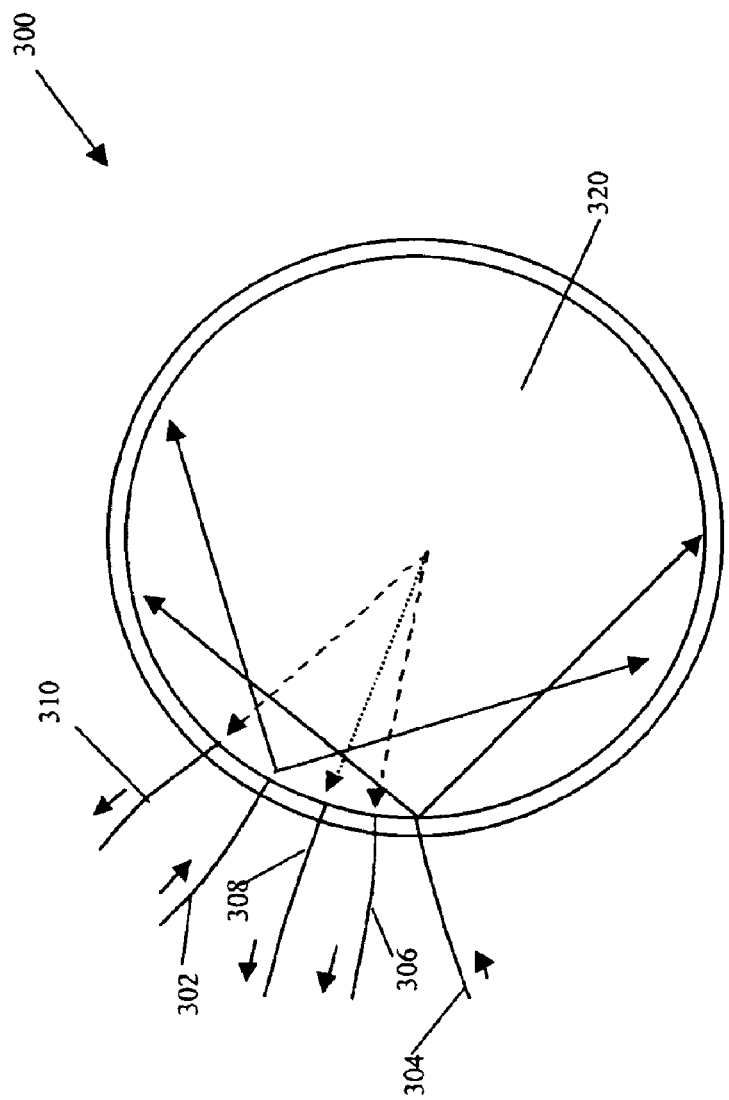
FIG. 3 shows a programmed holographic structure with multiple inputs and outputs, according to an embodiment of the invention.

A programmed holographic structure enables the designer to create, in a single device, a family of input ports, each of which is coupled to one or more of a family of output ports, with each input-output connection possessing a temporal transfer function independent of other temporal transfer functions. For example, FIG. 3 shows a device 300, in which two input ports 302, 304 feed input signals to a programmed holographic structure 320, and three output ports 306, 308, 310 receive output from the programmed holographic structure 320. Each temporal-image diffractive structure in a programmed holographic structure may be designed to implement a design transfer function, and temporal-image diffractive structures may be superimposed.

An application of the multiple path potential of programmed holographic structures is afforded by the following example of an optical packet decoder. An input port of a programmed holographic structure is mapped with connection-specific transfer functions, to a family of output ports. The transfer function associated with each connection (also termed a "cross-correlating transfer function" herein) cross-correlates input signals against a specific reference waveform (a reference waveform is also called a reference packet herein). A cross-correlating transfer function is typically calculated as the complex conjugate of the Fourier transform of a reference waveform. In a fully integrated device, output ports may be replaced with an integrated photodiode array and support electronics to provide optical packet-to-electronic conversion, rather than optical bit-to-electronic conversion. Support electronics for the integrated photodiode array may comprise the following: electronic circuitry that selectively detects signal waveforms representing matched correlations to a reference waveform, thresholding sensing circuitry, and power supply (as needed).

Figure 4:
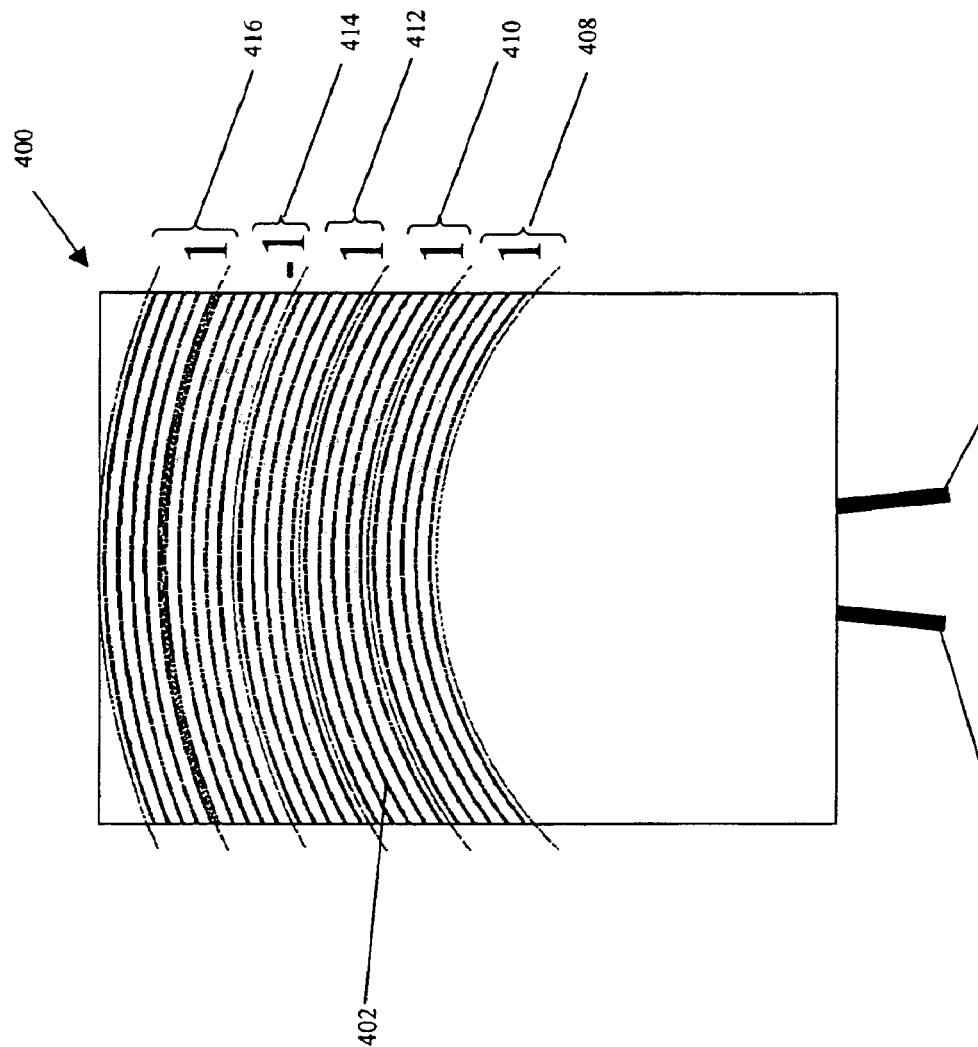
FIG. 4 shows a programmed holographic structure configured as a coding/decoding device, according to an embodiment of the invention.

FIG. 4 shows a programmed holographic structure 400 according to an embodiment of the invention. In accordance with the illustrated embodiment of FIG. 4, programmed holographic structure 400 comprises one or more sets of diffraction elements 402 which are shaped as similar curves, the diffraction elements within each set being chosen to provide reflective imaging of wavefronts emitted from an input port 404 onto an output port 406. Input is provided through the input port 404, which may be angled towards the center of the programmed holographic structure in order to effect the overlap of an input optical beam and an output optical beam, typically resulting in increased efficiency of the device.

In the discussion that follows, a pair of conjugate image positions of a set of curves is defined by the relationship that certain spectral components of a signal emanating from one image position, are focused by the spatial transfer function of the programmed holographic structure, to the conjugate image position; furthermore the two positions act reciprocally, so that the same spectral components within a signal emanating from the second position are focused by the transfer function onto the first position. The input port 404 and the output port 406 may be respectively situated at conjugate image positions of a set of diffraction elements 402 comprising a family of curves, with the diffraction elements 402 spaced $\lambda_o/2$ apart, where $\lambda_o$ is an optical carrier wavelength measured in the waveguide medium. As seen in FIG. 4, the diffraction elements 402 may be broken into segments 408, 410, 412, 414, 416, a segment comprising one or more diffraction elements, each segment controlling a distinct time-slice in the temporal impulse response function that characterizes effect of the device on an optical signal input at the input port 404, an output emerging at the output port 406. Control over the phase and amplitude of these segments allows for complete control over the temporal impulse response function, and hence the spectral transfer function of the programmed holographic structure.

FIG. 4 illustrates an example of how a programmed holographic structure might be implemented that correlates an input optical signal with a reference optical signal whose complex amplitude varies in time according to the sequence (1,−1,1,1,1). The −1 value of the complex amplitude represents a $\pi$ phase shift. Note that the segment 414 is phase-shifted by an amount of $\pi/2$, i.e., additional optical path length of $\lambda_o/4$, with respect to the other segments, producing a round-trip phase shift of $\pi$. This imparts the necessary coding for the programmed holographic structure to produce an auto-correlation peak at the output, when an input optical signal (possessing a complex amplitude) has substantially the same temporal variation as the reference optical signal. By implementing controls that allow for smaller phase shift, poly-phase codes can be encoded and processed in similar fashion.

Combining programmed holographic structures with electronic and photonic circuit technology, is of particular interest. In one embodiment, detectors such as a photodiode array, along with support electronics that may include electronic circuitry that selectively detects signal waveforms representing matched correlations to a reference waveform, thresholding sensing circuitry, and power supply (as needed), may be integrated directly onto the output ports, providing an integrated, robust, multi-channel decoder.

A configurable programmed holographic structure is a programmed holographic structure that enables a user to control one or more program characteristics. According to one implementation of the invention, program characteristics comprise an implementation of a transfer function which, when interacting with an input signal, produces an output signal whose characteristics typically differ from that of the input signal. These signal characteristics comprise wavefront shape, wavefront direction and temporal waveform. The program characteristics are modified by changing optical characteristics of the structure, typically through addition of energy through energy channeling means such as electronic circuitry. The energy channeling means are coupled to the programmed holographic structure and act as control mechanisms. Energy sources may comprise electromagnetic, thermal, photonic, acoustical, nuclear, chemical, and combinations thereof; typically energy sources comprise electromagnetic, thermal and photonic. The coupling may be effected through, e.g., proximity of a programmed holographic structure to the energy channeling structures, which may be integrated on a monolithic substrate.

Figure 5:
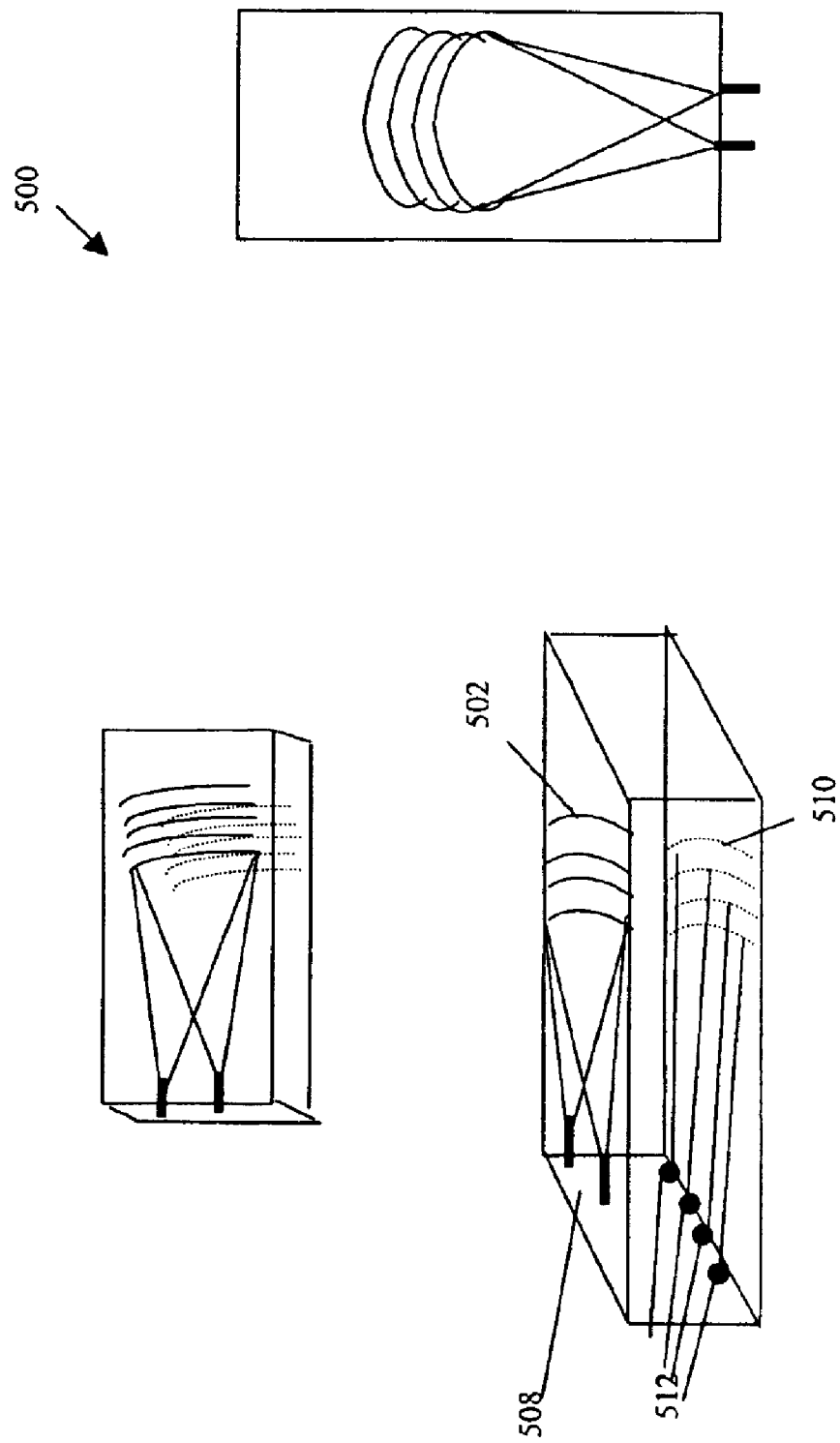
FIG. 5 shows a configurable programmed holographic structure, configurable by a set of electrical traces situated in a plane parallel to the configurable programmed holographic structure, according to an embodiment of the invention.

In one embodiment as shown in FIG. 5, dynamic control (also called dynamic configurablility herein), which is control that may vary in time and hence effect re-configuring of a configurable programmed holographic structure 508, can be implemented by placing the configurable programmed holographic structure 508 on an integrated circuit chip 500 that further comprises one or more groups of electrical traces 510. Due in part to the spatial design of the plurality of electrical traces 510 on the chip 500, the electrical traces 510 can impart, via direct or indirect electro-optic effects, changes in optical characteristics, such as the index of refraction, of the optical material in close proximity to the group of electrical traces 510, forming a dynamically configurable programmed holographic structure. Application of control voltages (which control voltages may change over time) through electrical terminals 512 to different groups of conductive traces, can control the amplitude and phase of different segments of diffractive elements, thereby dynamically controlling the configurable programmed holographic structure transfer function.

Figure 6:
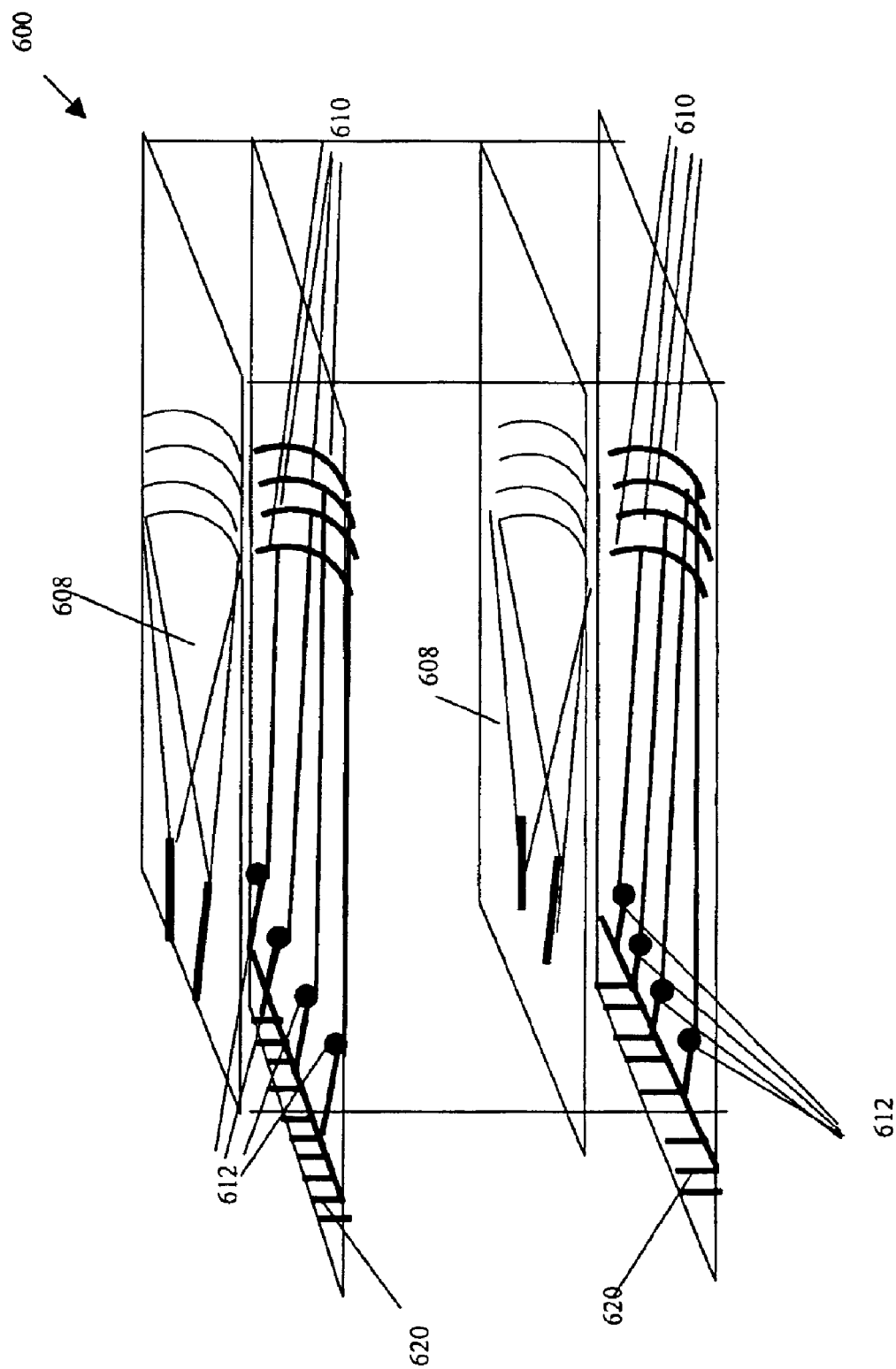
FIG. 6 shows a plurality of configurable programmed holographic structures, each of which is configurable by a set of electrical traces situated in a plane parallel to an adjacent configurable programmed holographic structure, according to an embodiment of the invention.

In another embodiment depicted in FIG. 6, multiple layers of conductive traces 610 allow for multiple configurable programmed holographic structures 608 to be re-configured, with dynamic control effected through application at electrical terminals 612 of user-determined control voltages. Control logic 620 can be implemented as part of the integrated circuitry, greatly simplifying the packaging of the device 600, i.e., eliminating complicated wire-bonding or interconnections. For instance, the case of an optical decoder device, the entire device may be implemented on a single chip, with only a single grooved optical waveguide input coupling, and no coupling lens needed.

Dynamic control, through dynamic configuration of the configurable programmed holographic structure, is not limited to the control or generation of waveforms. The integrated configurable programmed holographic structures described above can also be employed to solve the general problem of dynamically interconnecting multiple input and output ports in various application areas, including those involving Wavelength Division Multiplexing (WDM).

Several implementations will now be discussed.

WDM Cross-Connect/Multiplexer

Figure 7:
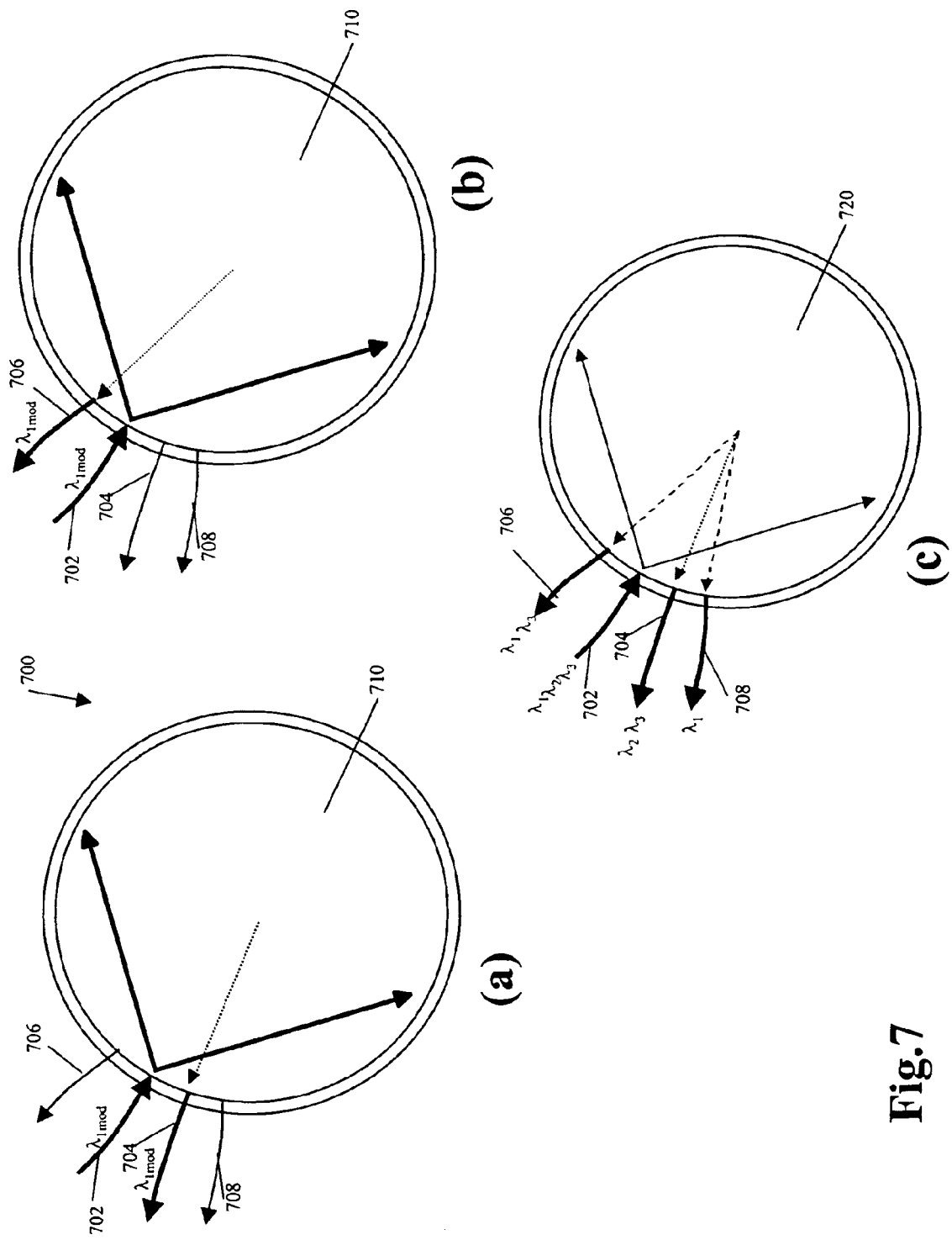
FIG. 7 shows a configurable programmed holographic structure in a WDM multiplexer application, according to an embodiment of the invention.

A configurable programmed holographic structure's ability to function in WDM applications reveals clear immediate potential for use in optical communication systems. FIG. 7 shows implementations of a configurable programmed holographic structure 700. For example, in FIG. 7(a) a communication channel comprising an encoded optical carrier wavelength $\lambda_{1mod}$, arriving at an input port 702 of a configurable programmed holographic structure 710, is directed to an output port 704. In FIG. 7(b) the configurable programmed holographic structure has been re-configured, directing the encoded optical carrier wavelength to output port 706. A multiply-programmed configurable programmed holographic structure comprising a plurality of superimposed patterns, allows the configurable programmed holographic structure to be dynamically reconfigured so that, for example, multiple WDM channels arriving at an input port may be individually and selectively redirected to any or all of a set of output ports. In FIG. 7(c) a multiply-programmed configurable programmed holographic structure 720 is dynamically configured so that wavelengths $\lambda_1$, $\lambda_2$, $\lambda_3$, arriving at an input port 702 are redirected so that $\lambda_1$ is output on an output port 708; $\lambda_2$ and $\lambda_3$, are output on an output port 704; and $\lambda_1$ and $\lambda_3$, are output on an output port 706.

Optical Decoder

Figure 8:
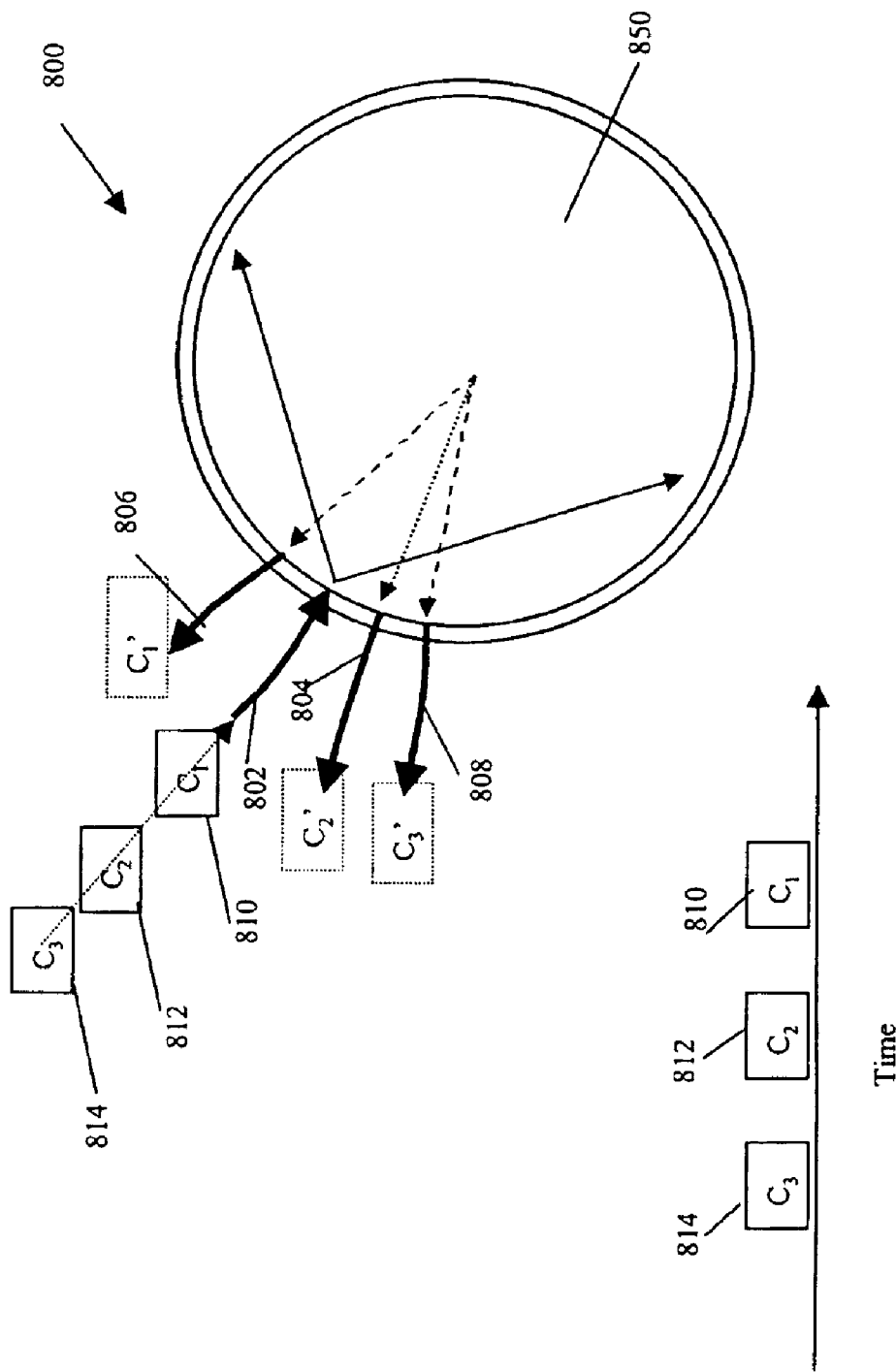
FIG. 8 shows a configurable programmed holographic structure in an optical packet decoder application, according to an embodiment of the invention.

One application of the configurable programmed holographic structure is to act as the decision-making component in a high-bandwidth optical decoder. A configurable programmed holographic structure can receive and operate in real-time, on packet headers that are coded at bandwidths exceeding several Gigahertz (GHz). This can be accomplished as follows: feeding a small portion of an incoming data stream to the configurable programmed holographic structure, (the configurable programmed holographic structure may also act as a splitter; alternatively, an external coupler can be used) the configurable programmed holographic structure acts on the packets contained in the data stream, as a temporal-code-to-spatial-code converter; the spatial codes can then be quickly converted to electronic signals that control the switching device. The latter is particularly practical with a configurable programmed holographic structure that is integrated on an integrated circuit. FIG. 8 shows a configurable programmed holographic structure implemented as an optical decoder 800. Optical packets 810, 812, and 814 are input to an input port 802. The signal emerging from each of the output ports 804, 806, 808 is the cross-correlation of the input signal with a reference packet.

Dynamic Programming

There are several methods that can be used to dynamically control the temporal, processing, and spatial attributes of a configurable programmed holographic structure, through control of one or more optical characteristics of the material comprising the configurable programmed holographic structure, optical characteristics comprising those physical parameters wherein a change in the value of the physical parameter effects a change in the interaction of the material with an incoming optical signal.

In one embodiment, the basic operational units of a configurable programmed holographic structure comprise segments, each of which comprises a plurality of diffractive elements spatially grouped together; alternatively a segment may comprise a single diffractive element. The frequency selectivity of the configurable programmed holographic structure is given approximately by c/2nL, where L is the entire length of the configurable programmed holographic structure and n is the average index of refraction within the configurable programmed holographic structure. The selectivity of an individual segment of the configurable programmed holographic structure is given approximately by c/2nd, where d is width of a segment. For an embodiment comprising uniformly sized non-overlapping segments, d≈L/N, where N is the number of segments. In addition to uniformly sized distinct partitions, there are other schemes for segmenting configurable programmed holographic structures; these other schemes also fall within the scope and spirit of the invention.

Figure 9:
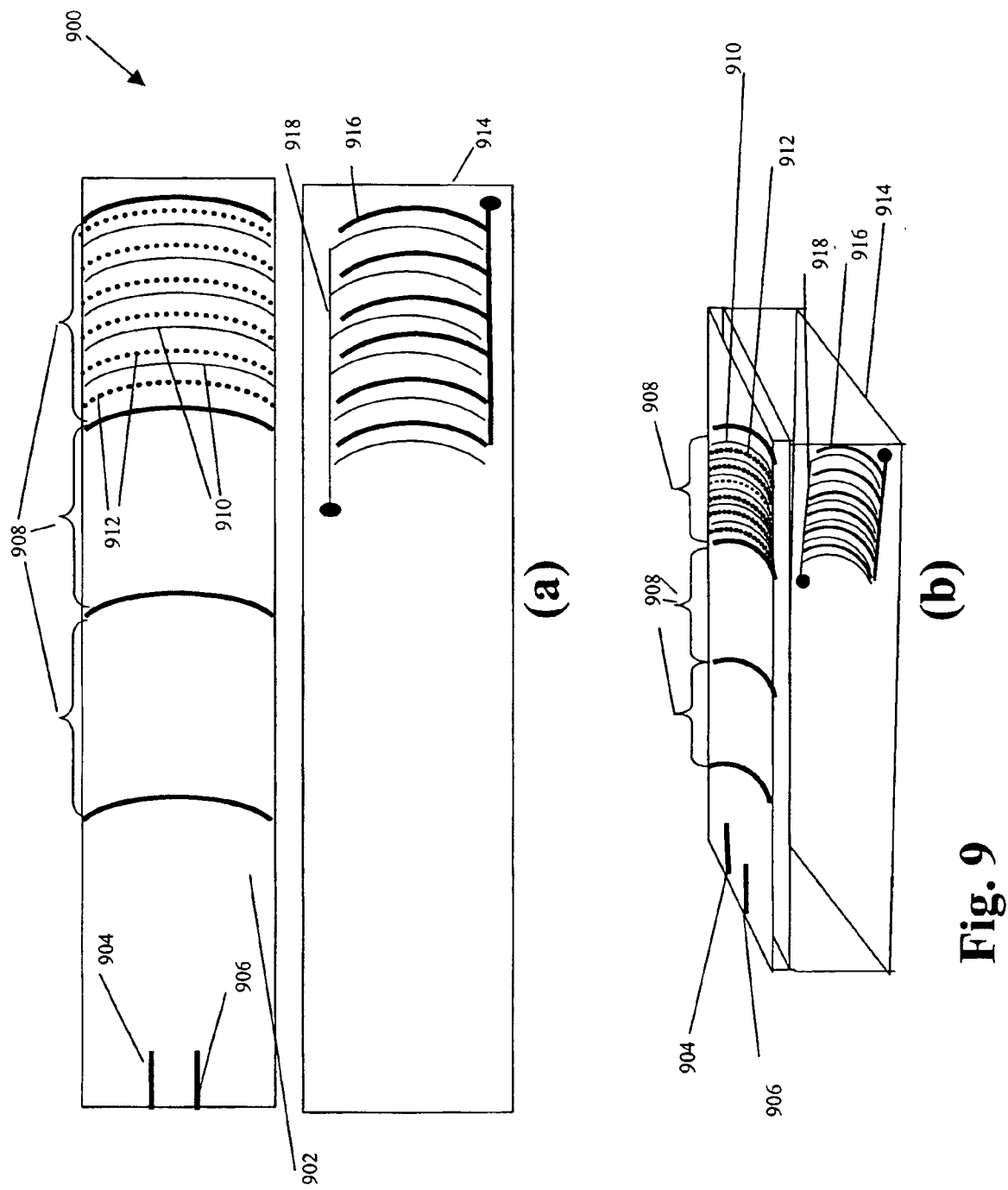
FIG. 9 shows a configurable programmed holographic structure comprising a plurality of segments and a set of electrical traces to alter the spatial structure of a segment, according to an embodiment of the invention.

The program characteristics of a configurable programmed holographic structure may be altered, configured, or re-configured by a number of techniques. According to one implementation, the spatial structure of one or more segments may be altered by several means, including electrical and optical means. Spatial structure refers to the spatial profile of one or more optical characteristics, e.g., index of refraction. In one embodiment, a segment's spatial structure may be altered by applying a voltage to one or more sets of underlying patterned electrical traces, which may effect a change in the index of refraction of diffractive elements located in the proximity of, e.g., directly above or below, the sets of electrical traces. FIG. 9 (FIG. 9a is an overhead view, FIG. 9b is a side view) depicts an embodiment wherein the spatial structure of a configurable programmed holographic structure may be altered via electrical traces 916, 918 situated on a plane adjacent to the configurable programmed holographic structure, integrated with the configurable programmed holographic structure on a monolithic substrate. In this embodiment, a configurable programmed holographic structure 902 comprises an input port 904, an output port 906, a plurality of segments 908, and two sets of electrical traces 916, 918, the electrical traces 916 and 918 positioned adjacent to the configurable programmed holographic structure on a plane parallel to the configurable programmed holographic structure 902 within a monolithic structure 900. Through an electro-optic effect that can modify the index of refraction in close proximity to an electrical trace, applying a voltage (with respect to ground) to the set of traces 916 causes the diffractive elements to be positioned at locations centered on arcs 910, whereas applying a voltage to the traces 918 causes the diffractive elements to be positioned at locations centered on arcs 912. Although this figure shows the traces situated below the configurable programmed holographic structure, conductive traces may be situated in any orientation that permits coupling to the configurable programmed holographic structure; also, the number of such sets of traces, their shape, and configuration may vary with application.

Figure 10:
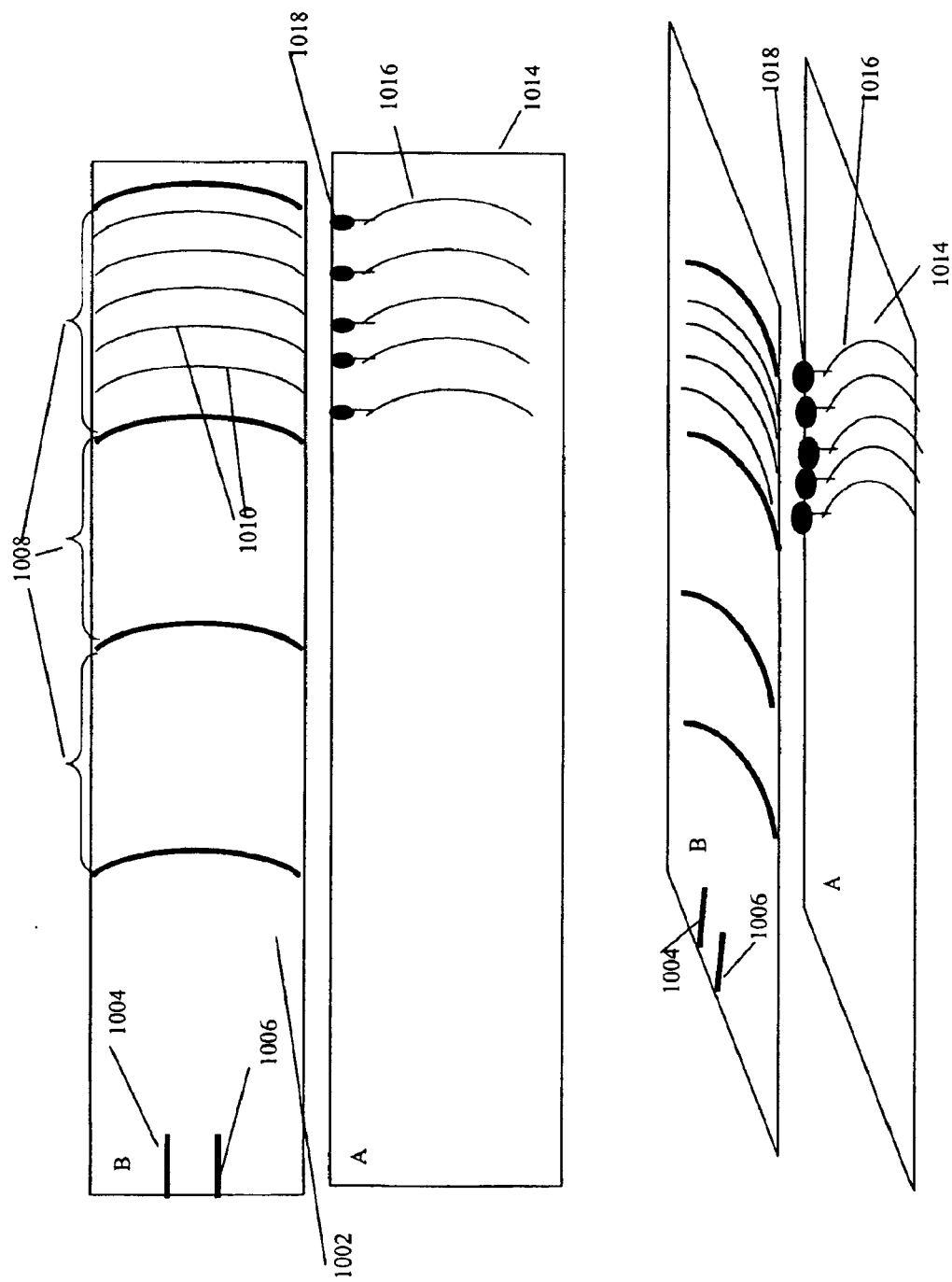
FIG. 10 shows a configurable programmed holographic structure with individual control elements situated below diffraction elements, according to an embodiment of the invention.

In another implementation, varying voltages may be applied to individual traces which are not connected to one another. FIG. 10 shows such an implementation. Adjusting the respective voltage applied to individual traces 1016 may, for instance, control the index of refraction of one or more diffractive elements 1010 comprising a segment 1008, which can be used to, e.g., adjust the amplitude of the output signal, or to encode a waveform with arbitrary amplitude and phase modulation. The spacing of the traces 1016 varies with the required phase control. For simple on/off control, the trace spacing may equal the fringe spacing of roughly $\lambda/2$. Higher order diffraction may also be used so that fringe spacing is some integer multiple of $\lambda/2$. For a carrier wavelength $\lambda_0=1.5$ microns, in materials with indices of refraction ranging approximately from n=1.5 to approximately n=3, the spacing of traces is on the order of 0.5 to 1.0 microns, well within the capabilities of current electronic patterning technologies.

It should be pointed out that these spacing requirements apply to the case where the respective angles between the respective output port(s) and respective input port(s) is much less than 1 radian. The spacing requirements are actually relaxed somewhat at larger angles. Also, this assumes no skipping of traces as one can do when configuring the diffractive structure to operate on higher order diffraction. For finer phase shifting, e.g., quadrature phase-shift keying and multi-level phase-shift keying, the control electrode traces may make finer shifts in the spatial structure of one or more segments. Fine phase control may be achieved by applying different voltages to the various control electrodes, akin to summing a sin wave and a cosine wave to achieve a phase-shifted sine wave.

Figure 11:
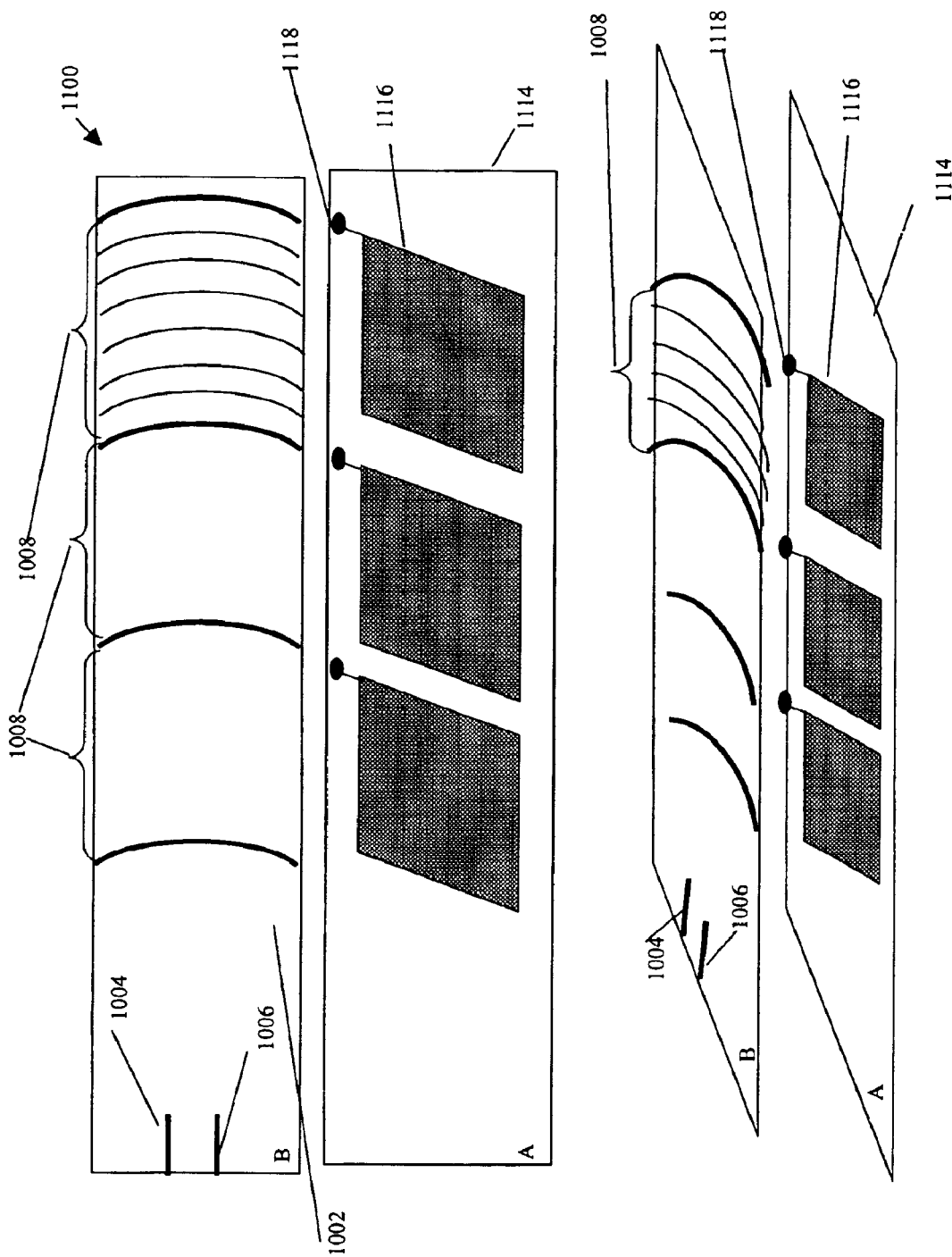
FIG. 11 shows a configurable programmed holographic structure, a control element situated below a segment controlling the average index of refraction of the segment, according to an embodiment of the invention.

Another implementation for altering the function of a segment within a configurable programmed holographic structure is to alter the average index of refraction of the segment. In one embodiment, it is assumed that the segment's spatial structure is either fixed or switchable between a finite number of states. The average index of refraction of each segment can be controlled by several means, including electronic, optic, and thermal; in the embodiment discussed here the average index of refraction will be assumed to be controlled via an electro-optic effect. Each segment of a configurable programmed holographic structure may have an electrode e.g., above or below the configurable programmed holographic structure, that alters the average index of refraction of the segment. This embodiment is illustrated in FIG. 11. A segment 1008 of a configurable programmed holographic structure 1002 is situated above an electrical trace 1116 which may be held at a voltage via a connector 1118.

Shifting the average index of refraction of a segment may have two consequences: 1) a shift in the center of the wavelength response curve of the segment, from its initial value $\lambda_0$, to a value $(n+\Delta n)\lambda_0/n$, where n is the intial average index of refraction and $\Delta n$ is the change in average index of refraction for the segment; and 2) a shift in the phase of the optical signal as it passes through the segment with the altered average index of refraction; the phase shift is doubled for an optical signal that passes back through the segment a second time in its path to the output port. The phase shift for a single pass through a segment is $2\pi(\Delta n\, d/\lambda)$, where $\lambda$ is the processed wavelength and d is width of the segment. Each segment may have its own controlled average index of refraction, or may be coupled with one or all of the other segments.

Figure 12:
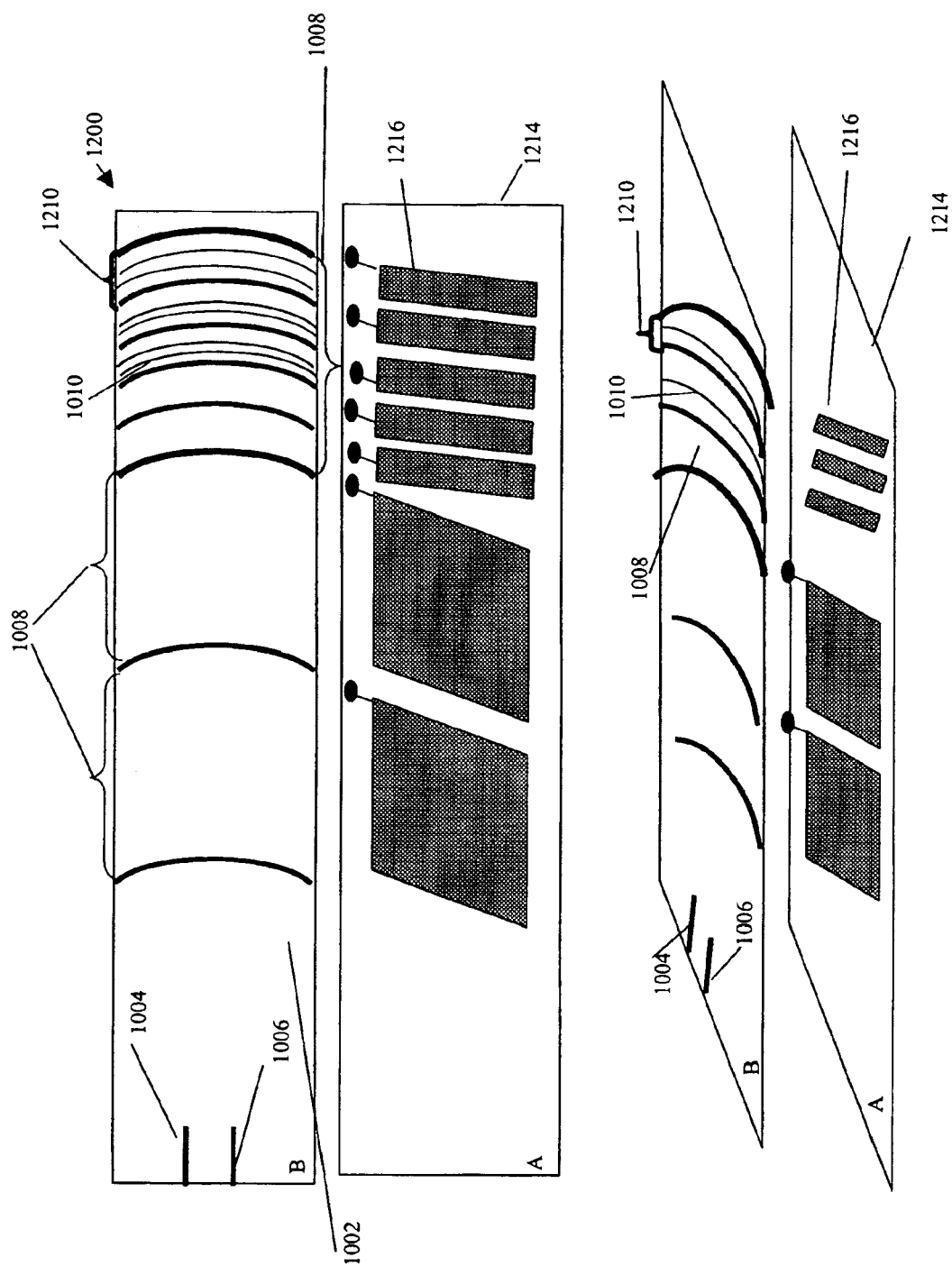
FIG. 12 shows a configurable programmed holographic structure with a plurality of control elements situated below a respective set of sub-segments, each control element controlling the average index of refraction of the respective sub-segment, according to an embodiment of the invention

The implementation of altering the average index of refraction of the segment, as described above, may be used for calibration or stabilization purposes, such as to maintain the configurable programmed holographic structure at the proper operating wavelength. In another application for this implementation, as exemplified in another embodiment as shown in FIG. 12, each segment 1008 may comprise multiple sub-segments, a sub-segment 1210 comprising one or more diffractive elements 1010 within the segment and typically less than all of the diffractive elements 1010 comprising the segment 1008, each sub-segment of which may have different average index of refraction which may be controlled by an electrical trace 1216 situated below (or adjacent to) the sub-segment. Such an embodiment may be useful in e.g., a multiplex application, or for a steering application which is similar to the operation of a phased array.

Figure 13:
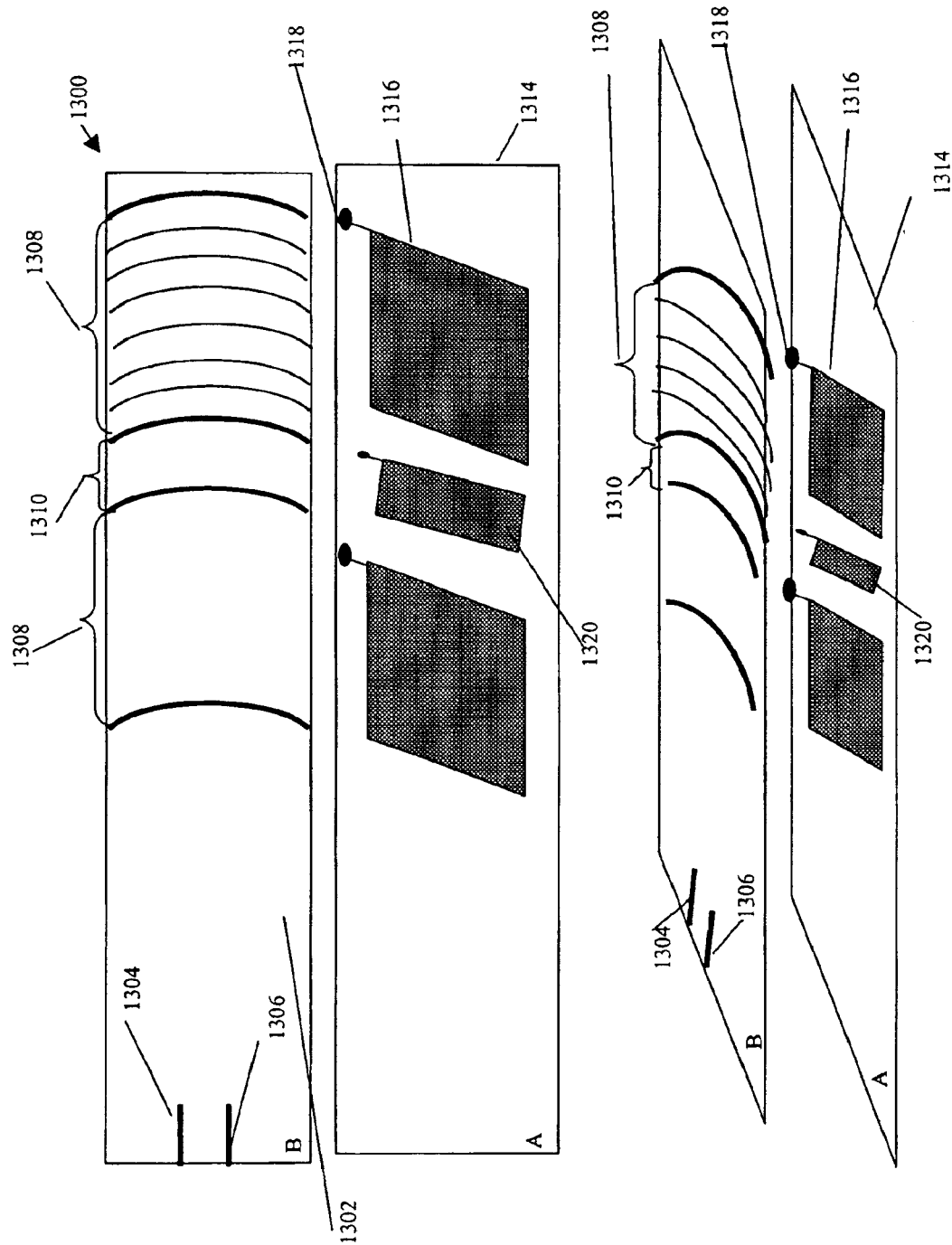
FIG. 13 shows a configurable programmed holographic structure with a gap situated between two segments, a control element situated beneath the gap controlling the index of refraction of the gap, according to an embodiment of the invention.

Another implementation for altering, configuring, or re-configuring configurable programmed holographic structure employs small gaps between segments, within which the index of refraction may be controlled. Here again, it is assumed that the spatial structure is either fixed, or else the spatial structure is switchable between a finite number of states. Consider a configurable programmed holographic structure of nominal thickness L, divided into N segments of thickness d=L/N. In one embodiment, between each segment is situated a gap of thickness $\delta$. The gap may have an electrode positioned in close proximity, e.g., above or below it. An embodiment employing this implementation is illustrated in FIG. 13. A configurable programmed holographic structure 1302 comprises a plurality of segments 1308. A gap 1310 is situated between two segments 1302. The index of refraction of the gap 1310 is controlled by an electrode 1320 whose potential can be varied, resulting in a change in the index of refraction of the gap 1320, via an electro-optic effect.

Assuming that the material in the gap is electro-optically active, application of a voltage to the electrode may cause a shift $\Delta n$ in the index of refraction of the gap, resulting in an optical path difference of (Δn δ) for light passing through the gap. This corresponds to a phase shift for the light, of $$\varphi = \frac{\Delta n \delta}{\lambda} \cdot (2\pi)$$

on single pass, or $$\varphi = \frac{2\Delta n \delta}{\lambda} \cdot (2\pi)$$

the light passes back through the gap. Segments contribute to the temporal impulse response function of the holographic structure such that segments closest to the input port contribute to the earliest temporal intervals while segments farthest from the input port contribute to the trailing temporal intervals. A particular gap effects phase shifts on the light returned by all segments located farther from the input port than the gap and hence to all temporal portions of the impulse response function later than the time corresponding to the first segment farther from the input port than the gap. To shift the phase of light reflected from only a single segment, gaps located before and after the segment with opposite phase shifts can be employed. Let $\Phi_j = 2\pi(\Delta n_j \delta_j)/\lambda$ be the phase shift introduced by a gap located just to the input-port-side of segment j, which segment possesses a complex transfer function $G_j$. The optical field that will exit the output port of the device after interacting with the N segments of the holographic structure and associated phase-control gaps will be $$E_{out}(t) = \sum_{k=1}^{N} \left[ E_{in}(t - (2knd/c)) G_k \prod_{j=1}^{k} e^{i(2\varphi_j)} \right]$$

where $E_{in}(t)$ is the input signal whose entry into the input port results in the generation of the output signal $E_{out}(t)$ and n is the average index of refraction seen by signals propagating through the holographic structure.

Combinations of the above-described programming and dynamic control implementations can be used for both gross and fine control of the phase relationships of the segments, as well as for overall tuning of the grating for calibration purposes. For example, a preferred embodiment for encoding and decoding multi-level phase shift keyed codes is to 1) employ spatial structure changes to effect large phase shifts in individual segments, 2) use the gap method to make fine adjustments to the phase shifts of the segments, and 3) use the full-segment index of refraction changes to tune the structure to the desired operation wavelength.

One of the factors that will need to be considered in the implementation of configurable programmed holographic structures based on temporal-image diffractive patterns, is the stabilization of the properties of the configurable programmed holographic structures relative to changes in ambient temperature. The higher the spectral resolution demanded, the greater will be the challenge of packaging configurable programmed holographic structures with adequate thermal stability. This is a common problem in optical devices wherein spectral response derives from physical structure. Great strides in thermal compensation have been made in the case of thin film and fiber grating devices. Many of those same compensation/stabilization methods can be applied to configurable programmed holographic structures. Alternatively or in addition, simple reference patterned structures can be designed into the configurable programmed holographic structure devices, to produce a reference signal for active locking. In the case of an integrated circuit-based configurable programmed holographic structure, all active stabilization may be integrated onto the single monolithic waveguide/electronic substrate.

Having illustrated and described the principles of the invention in the above-described embodiments, it should be apparent to those skilled in the art that the embodiments can be modified in arrangement and detail without departing from such principles. In view of the many possible embodiments to which the presented may be applied, it should be recognized that the illustrated embodiments are only examples of the invention and should not be taken as a limitation on the scope of the invention. Rather, the invention is defined by the following claims. It is therefore claimed as the invention all such embodiments that come within the scope and spirit of these claims.

What is claimed is:

1. A method comprising dynamically configuring a configurable programmed holographic structure comprising a set of diffractive elements and at least one optical port by introduction of energy to the configurable programmed holographic structure, thereby modifying at least one optical characteristic of the configurable programmed holographic structure, wherein, before or after configuring:

the diffractive elements of the set are collectively arranged so as to comprise temporal, spectral, or spatial transformation information, each diffractive element of the set is individually contoured and positioned so as to reflectively image at least a portion of an input optical signal between an input optical port and an output optical port as the input optical signal propagates within the holographic structure, the diffractive element set transforms the imaged portions of the input optical signal into an output optical signal according to the transformation information as the optical signals propagate within the holographic structure between the input optical port and the output optical port.

2. The method of claim 1, wherein the energy is introduced through a conductive trace, the trace coupled to the configurable programmed holographic structure.

3. The method of claim 1, wherein the modified optical characteristic is an index of refraction of a diffractive element.

4. The method of claim 1, the configurable programmed holographic structure further comprising a plurality of segments, each segment comprising at least one diffractive element, each segment comprising an average index of refraction.

5. The method of claim 4, wherein the modified optical characteristic is the average index of refraction of at least one segment.

6. The method of claim 4, each segment comprising a spatial structure.

7. The method of claim 5, the dynamic configuration effected by changing the spatial structure of at least one segment.

8. The method of claim 4, the configurable programmed holographic structure further comprising at least one gap comprising a material having a refractive index, the at least one gap situated between two adjacent segments, the energy introduced coupling with the at least one gap to effect dynamic configuration.

9. The method of claim 8, wherein the energy introduced is to change the refractive index of the material.

10. The method of claim 8, wherein the energy is supplied through at least one conductive trace coupled to the at least one gap.

11. The method of claim 4, wherein a segment comprises a plurality of sub-segments each of which comprises an index of refraction, and wherein the energy introduced coupling with at least one sub-segment is to effect dynamic configuration.

12. The method of claim 1, wherein the diffractive elements of the set are collectively arranged, before or after configuring, so as to exhibit positional variation in amplitude, optical separation, or spatial phase over some portion of the set.

13. The method of claim 12, wherein:
the diffractive elements of the set are collectively arranged, before configuring, so as to exhibit positional variation in amplitude, optical separation, or spatial phase over some portion of the set; and
the diffractive elements of the set are collectively arranged, after configuring, so as to exhibit altered positional variation in amplitude, optical separation, or spatial phase over some portion of the set.

14. The method of claim 1, wherein the diffractive element set transforms, before configuring, the imaged portions of the input optical signal into the output optical signal according to the transformation information as the optical signals propagate within the holographic structure between the input optical port and the output optical port.

15. The method of claim 14, wherein the diffractive element set transforms, after configuring, the imaged portions of the input optical signal into an altered output optical signal according to altered transformation information as the optical signals propagate within the holographic structure between the input optical port and the output optical port, the altered output optical signal differing from the output optical signal in temporal waveform, optical spectrum, or spatial wavefront.

16. The method of claim 14, wherein the diffractive element set transforms, after configuring, the imaged portions of the input optical signal into an altered output optical signal according to altered transformation information as the optical signals propagate within the holographic structure between the input optical port and the output optical port, the altered output optical signal differing from the output optical signal in temporal waveform or optical spectrum.

17. The method of claim 14, wherein configuring the holographic structure results in substantial elimination of the output optical signal.

18. The method of claim 1, wherein the diffractive element set transforms, after configuring, the imaged portions of the input optical signal into the output optical signal according to the transformation information as the optical signals propagate within the holographic structure between the input optical port and the output optical port.

19. The method of claim 18, wherein the output optical signal is substantially absent before configuring.

20. The method of claim 1, wherein the input optical port and the output optical port comprise a common optical port.

21. The method of claim 1, wherein the input optical port and the output optical port comprise distinct optical ports.

22. The method of claim 1, wherein the holographic structure comprises a planar waveguide substantially confining in one dimension the optical signals propagating in two dimensions therein.

23. The method of claim 1, wherein the energy introduced is electromagnetic energy.

24. The method of claim 1, wherein the energy introduced is thermal energy.

25. The method of claim 1, wherein the energy introduced is photonic energy.

26. The method of claim 1, wherein the energy introduced is acoustic energy.

27. The method of claim 1, wherein the energy introduced is nuclear energy.

28. The method of claim 1, wherein the energy introduced is chemical energy.

29. The method of claim 1, wherein the energy introduced is electrical energy.

30. The method of claim 2, wherein at least one conductive trace is positioned and contoured so as to substantially correspond to one of the diffractive elements.

31. The method of claim 2, wherein the energy is introduced through multiple conductive traces, the multiple conductive traces comprising at least two subsets, the energy introduction through each subset of the multiple conductive traces being independently controlled.

32. A method comprising:
configuring a configurable programmed holographic structure to route at least a portion of an optical signal between at least one chosen first optical port and at least one chosen second optical port, the configurable programmed holographic structure comprising a set of diffractive elements and at least one optical port;
receiving via an input optical port at least one optical signal into the configurable programmed holographic structure;
routing at least a portion of the optical signal between the input optical port and an output optical port; and
providing, at the output optical port, the routed portion of the optical signal as an output optical signal,
wherein:
the diffractive elements of the set are collectively arranged, after configuring, so as to comprise temporal, spectral, or spatial transformation information,
each diffractive element of the set is individually contoured and positioned, alter configuring, so as to reflectively image at least a portion of the optical signal between the first optical port and the second optical port as the optical signal propagates within the holographic structure,
the diffractive element set transforms, after configuring, the imaged portion of the optical signal into the output optical signal according to the transformation information as the optical signals propagate within the holographic structure between the input optical port and the output optical port.

33. The method of claim 32, wherein the configurable programmed holographic structure comprises a configurable de-multiplexer.

34. The method of claim 32, wherein the configurable programmed holographic structure comprises a configurable multiplexer.

35. The method of claim 32, wherein the diffractive elements of the set are collectively arranged, before or after configuring, so as to exhibit positional variation in amplitude, optical separation, or spatial phase over some portion of the set.

36. The method of claim 35, wherein:
the diffractive elements of the set are collectively arranged, before configuring, so as to exhibit positional variation in amplitude, optical separation, or spatial phase over some portion of the set; and
the diffractive elements of the set are collectively arranged, after configuring, so as to exhibit altered positional variation in amplitude, optical separation, or spatial phase over some portion of the set.

37. The method of claim 32, wherein:

the diffractive element set transforms, before configuring, the imaged portions of the input optical signal into an initial output optical signal according to initial transformation information as the optical signals propagate within the holographic structure between the first optical port and the second optical port; and the initial output optical signal differs from the output optical signal in temporal waveform, optical spectrum, or spatial wavefront.

38. The method of claim 32, wherein:

the diffractive element set transforms, before configuring, the imaged portions of the input optical signal into an initial output optical signal according to initial transformation information as the optical signals propagate within the holographic structure between the first optical port and the second optical port; and the initial output optical signal differs from the output optical signal in temporal waveform or optical spectrum.

39. The method of claim 32, wherein the output optical signal is substantially absent before configuring.

40. The method of claim 32, further comprising re-configuring the configurable programmed holographic structure to route at least a portion of an optical signal between the first optical port and the second optical port, wherein:

the diffractive elements of the set are collectively arranged, upon the configurable programmed holographic structure being re-configured, so as to comprise altered temporal, spectral, or spatial transformation information, the diffractive element set transforms, upon the configurable programmed holographic structure being re-configured, the routed portion of the optical signal into an altered output optical signal according to the transformation information as the optical signals propagate within the holographic structure between the first optical port and the second optical port, the altered output optical signal differing from the output optical signal in temporal waveform, optical spectrum, or spatial wavefront.

41. The method of claim 40, comprising re-configuring the configurable programmed holographic structure so as to substantially eliminate the output optical signal.

42. The method of claim 32, wherein the first optical port and the second optical port comprise a common optical port.

43. The method of claim 32, wherein the first optical port and the second optical port comprise distinct optical ports.

44. The method of claim 32, wherein the holographic structure comprises a planar waveguide substantially confining in one dimension the optical signals propagating in two dimensions therein.

45. The method of claim 32, wherein the holographic structure is configured by introducing energy into the holographic structure through a conductive trace, the trace coupled to the configurable programmed holographic structure.

46. The method of claim 45, wherein at least one conductive trace is positioned and contoured so as to substantially correspond to one of the diffractive elements.

47. The method of claim 45, wherein the energy is introduced through multiple conductive traces, the multiple conductive traces comprising at least two subsets, the energy introduction through each subset of the multiple conductive traces being independently controlled.

48. A method comprising:

applying energy in a time-varying manner to a configurable programmed holographic structure comprising a set of diffractive elements and at least one optical port, the diffractive elements of the set collectively defining a set of program characteristics, at least one of which varies with energy applied to the configurable programmed holographic structure, thereby varying the set of program characteristics in a time-varying manner;

receiving an input optical signal via an input port into the configurable programmed holographic structure, the input optical signal interacting with the diffractive element set of the configurable programmed holographic structure, thereby producing a modulated optical signal that is modulated in a time-varying manner; and providing the modulated optical signal at an output port, wherein:

each diffractive element of the set is individually contoured and positioned so as to reflectively image at least a portion of the input optical signal between the input port and the output port as the input optical signal propagates within the holographic structure, the diffractive element set transforms the imaged portions of the input optical signal into the modulated optical signal according to the time-varying set of program characteristics as the optical signals propagate within the optical medium between the input port and the output port.

49. The method of claim 48, wherein the diffractive elements of the set are collectively arranged so as to exhibit positional variation in amplitude, optical separation, or spatial phase over some portion of the set.

50. The method of claim 48, wherein the input optical port and the output optical port comprise a common optical port.

51. The method of claim 48, wherein the input optical port and the output optical port comprise distinct optical ports.

52. The method of claim 48, programmed holographic structure further comprising a variable spatial structure, and wherein varying the set of program characteristics comprises varying the spatial structure.

53. The method of claim 48, wherein the energy is applied to the holographic structure through a conductive trace, the trace coupled to the configurable programmed holographic structure.

54. The method of claim 53, wherein at least one conductive trace is positioned and contoured so as to substantially correspond to one of the diffractive elements.

55. The method of claim 53, wherein the energy is introduced through multiple conductive traces, the multiple conductive traces comprising at least two subsets, the energy introduction through each subset of the multiple conductive traces being independently controlled.

56. The method of claim 48, further comprising applying the energy through a conductive trace which is coupled with the programmed holographic structure.

57. The method of claim 48, wherein the input optical signal interacts with the configurable programmed holographic structure to produce one of an optical signal encoded with multi-level phase shift key coding, and a multi-level phase shift key-decoded optical signal.

58. The method of claim 48, programmed holographic structure further comprising a gap situated between two adjacent diffractive elements, the gap comprising an index of refraction, and wherein changing a program characteristic further comprises changing the index of refraction of the gap.

59. The method of claim 48, the programmed holographic structure further comprising at least one segment, and wherein varying a program characteristic further comprises changing the index of refraction of the at least one segment.

60. The method of claim 48, wherein the holographic structure comprises a planar waveguide substantially confining in one dimension the optical signals propagating in two dimensions therein.

61. A method comprising:

receiving an input optical signal via an input optical port into a configurable programmed holographic structure comprising a set of diffractive elements and at least one optical port, the diffractive elements of the set collectively defining a set of program characteristics and a proper operating wavelength range, the input optical signal interacting with the configurable programmed holographic structure;

directing the input optical signal to interact with the configurable programmed holographic structure, producing an output optical signal having an output power at an output optical port;

directing the output optical signal onto a power measurement device; and modifying the program characteristics of the configurable programmed holographic structure to maximize the output power, as measured by the power measurement device, wherein:

each diffractive element of the set is individually contoured and positioned so as to reflectively image at least a portion of the input optical signal between the input port and the output port as the input optical signal propagates within the holographic structure, the diffractive element set transforms the imaged portions of the input optical signal into the output optical signal according to the set of program characteristics as the optical signals propagate within the optical medium between the input port and the output port.

62. The method of claim 61 further comprising modifying the set of program characteristics by applying an energy to the configurable programmed holographic structure, for which at least one of the set of program characteristics varies with energy applied to the configurable programmed holographic structure.

63. The method of claim 61, wherein the diffractive elements of the set are collectively arranged so as to exhibit positional variation in amplitude, optical separation, or spatial phase over some portion of the set.

64. The method of claim 61, wherein the input optical port and the output optical port comprise a common optical port.

65. The method of claim 61, wherein the input optical port and the output optical port comprise distinct optical ports.

66. The method of claim 61, wherein the holographic structure comprises a planar waveguide substantially confining in one dimension the optical signals propagating in two dimensions therein.

67. The method of claim 61, wherein the program characteristics are modified by introducing energy into the holographic structure through a conductive trace, the trace coupled to the configurable programmed holographic structure.

68. The method of claim 67, wherein at least one conductive trace is positioned and contoured so as to substantially correspond to one of the diffractive elements.

69. The method of claim 67, wherein the energy is introduced through multiple conductive traces, the multiple conductive traces comprising at least two subsets, the energy introduction through each subset of the multiple conductive traces being independently controlled.

* * * * *